US009896086B2

(12) United States Patent
Ogawa

(10) Patent No.: US 9,896,086 B2
(45) Date of Patent: Feb. 20, 2018

(54) MOVING ASSIST APPARATUS AND METHOD

(71) Applicant: TOYOTA JIDOSHA KABUSHIKI KAISHA, Toyota-shi (JP)

(72) Inventor: Yuki Ogawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/119,928

(22) PCT Filed: Feb. 11, 2015

(86) PCT No.: PCT/IB2015/000135
§ 371 (c)(1),
(2) Date: Aug. 18, 2016

(87) PCT Pub. No.: WO2015/124983
PCT Pub. Date: Aug. 27, 2015

(65) Prior Publication Data
US 2017/0066429 A1    Mar. 9, 2017

(30) Foreign Application Priority Data

Feb. 24, 2014    (JP) ................................. 2014-032550

(51) Int. Cl.
*B60W 50/00*    (2006.01)
*B60W 20/00*    (2016.01)
(Continued)

(52) U.S. Cl.
CPC ............... *B60W 20/12* (2016.01); *B60K 6/28* (2013.01); *B60L 11/1862* (2013.01);
(Continued)

(58) Field of Classification Search
CPC .. B60W 20/12; B60W 20/13; B60W 50/0097; B60W 2250/402; B60L 11/186; B60Y 2300/182; Y02T 10/6291
See application file for complete search history.

(56) References Cited

U.S. PATENT DOCUMENTS

2009/0326750 A1* 12/2009 Ang ...................... B60W 10/04
701/22
2010/0185384 A1* 7/2010 Naito ..................... G01C 21/26
701/532
(Continued)

FOREIGN PATENT DOCUMENTS

EP    2 586 644 A1    5/2013
JP    2007-50888 A    3/2007
(Continued)

OTHER PUBLICATIONS

International Search Report Issued Jun. 3, 2015 in PCT/IB15/000135 Filed Feb. 11, 2015.

*Primary Examiner* — Michael J Zanelli
(74) *Attorney, Agent, or Firm* — Oblon, McClelland, Maier & Neustadt, L.L.P.

(57) ABSTRACT

A moving assist apparatus for assisting a vehicle to move from current position to destination includes a mode planning unit for, for each section obtained by dividing traveling route, planning one traveling mode from first mode of not maintaining a charge storage amount of the secondary battery and second mode of maintaining the charge storage amount of the secondary battery, based on a traveling load associated with the section. If the charge storage amount of the battery is above a first threshold, the mode planning unit takes a section after which the charge storage amount of the battery that is predicted with assumption of traveling with the first mode is below a second threshold less than the first threshold by taking the section being traveled by the vehicle (Continued)

or the next section as a reference, as a first mode priority section in which the first mode is planned in priority.

9 Claims, 7 Drawing Sheets

(51) Int. Cl.
*B60L 11/18* (2006.01)
*B60W 20/12* (2016.01)
*B60W 10/06* (2006.01)
*B60W 10/08* (2006.01)
*B60W 20/13* (2016.01)
*B60K 6/28* (2007.10)

(52) U.S. Cl.
CPC ............ *B60W 10/06* (2013.01); *B60W 10/08* (2013.01); *B60W 20/13* (2016.01); *B60W 50/0097* (2013.01); *B60W 2550/402* (2013.01); *B60W 2710/244* (2013.01); *B60Y 2200/92* (2013.01); *B60Y 2300/182* (2013.01); *B60Y 2300/18125* (2013.01); *B60Y 2300/91* (2013.01); *B60Y 2400/112* (2013.01); *Y02T 10/6291* (2013.01); *Y10S 903/907* (2013.01); *Y10S 903/93* (2013.01)

(56) References Cited

U.S. PATENT DOCUMENTS

| 2011/0160946 | A1 | 6/2011 | Wilde et al. |
| 2013/0096764 | A1 | 4/2013 | Yamamoto et al. |
| 2014/0046518 | A1* | 2/2014 | Roos .................. B60W 30/182 701/22 |
| 2014/0129070 | A1 | 5/2014 | Lutz et al. |

FOREIGN PATENT DOCUMENTS

| JP | 2009-12605 A | 1/2009 |
| JP | 2009-279989 A | 12/2009 |
| JP | 2013-159214 A | 8/2013 |
| JP | 2014-184892 | * 10/2014 |
| WO | 2013/001233 A2 | 1/2013 |

* cited by examiner

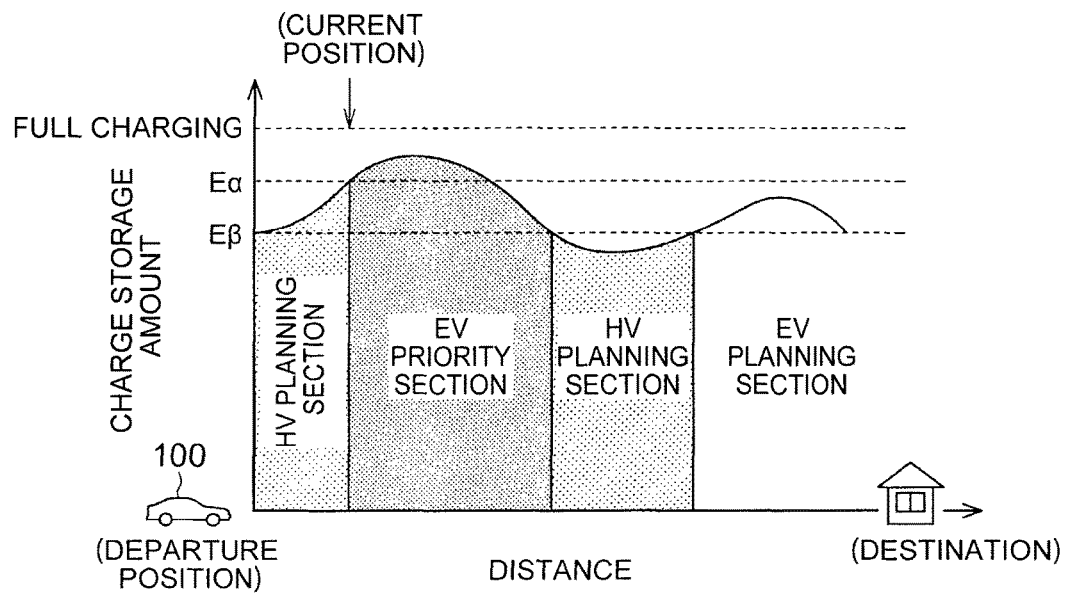
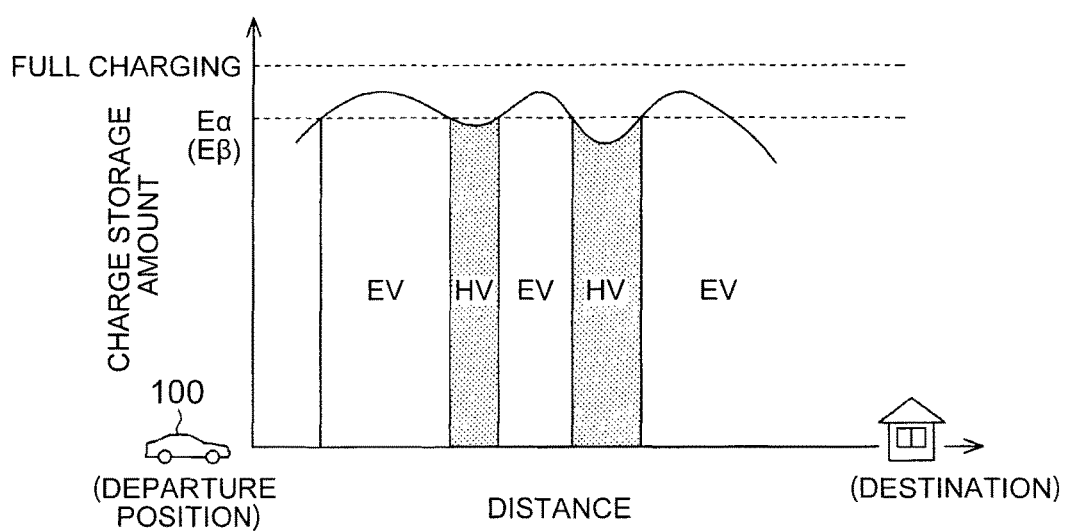

MOVING ASSIST APPARATUS AND METHOD

BACKGROUND OF THE INVENTION

1. Field of the Invention

The invention relates to a moving assist apparatus and a moving assist method which assist movement of a vehicle by applying one of a plurality of traveling modes of the vehicle.

2. Description of Related Art

As a vehicle including a plurality of traveling modes, a hybrid vehicle using an internal combustion engine and a motor apparatus as a driving source is known. The hybrid vehicle has a first mode in which EV traveling only using the motor while not maintaining a charge storage amount in a secondary battery is given priority, and a second mode in which HV traveling using the internal combustion engine and the motor while maintaining the charge storage amount in the battery is given priority. Further, in the hybrid vehicle, a regenerative braking is performed to charge a secondary battery with the motor apparatus functioning as a generator by turning off an accelerator or the like during traveling downslope or with a high speed.

Conventionally, as an example of an apparatus for controlling the hybrid vehicle including the plurality of traveling modes, an apparatus for dividing a route from a current position to a destination into a plurality of sections and setting an EV mode corresponding to the first mode or a HV mode corresponding to the second mode for each of these sections has been proposed (see Japanese Patent Application Publication No. JP 2009-12605 (JP 2009-12605)). In this apparatus, by associating an average speed with each of the divided sections and making a storage state of the battery at the destination to be close to a lower limit value, the HV mode is set for the section of a high average speed and the EV mode is set for other section.

However, even the traveling mode is set in the manner as described above, the storage state of the secondary battery may not always vary as predicted depending on for example a traffic flow condition, a road slope and the like. For example, in the case that the secondary battery is charged to above that predicted by the regenerative braking, if the storage state of the secondary battery has reached a fully charged state, the energy obtained by the regenerative braking can not be recovered by the secondary battery, but be released wastefully, and therefore entire energy efficiency is lowered.

SUMMARY OF THE INVENTION

Therefore, there is provided a moving assist apparatus and a moving assist method, which can improve energy efficiency by more suitably planning a first mode of not maintaining a charge storage amount in a secondary battery and a second mode of maintaining the charge storage amount in the secondary battery.

According to a first aspect of the invention, there is provided a moving assist apparatus for assisting a vehicle to move from a current position to a destination, the vehicle including: an internal combustion engine; a motor apparatus that functions as an electric motor and a generator; and a secondary battery that is a power source of the motor apparatus and that stores electric power generated by regenerative braking, the moving assist apparatus including: a mode planning unit configured to, for each section obtained by dividing a traveling route from the current position to the destination, plan one traveling mode from a first mode of not maintaining a charge storage amount of the secondary battery and a second mode of maintaining the charge storage amount of the secondary battery, based on a traveling load associated with the section, and if the charge storage amount of the secondary battery is above a first threshold, take a section after which the charge storage amount of the secondary battery that is predicted with assumption of traveling with the first mode is below a second threshold that is less than the first threshold by taking the section being traveled by the vehicle or the next section consecutive to this section as a reference, as a first mode priority section in which the first mode is planned in priority.

According to a second aspect of the invention, there is provided a moving assist method for assisting a vehicle to move from a current position to a destination by using a mode planning unit, the vehicle including: an internal combustion engine; a motor apparatus that functions as an electric motor and a generator; and a secondary battery that is a power source of the motor apparatus and that stores electric power generated by regenerative braking, the moving assist method including: for each section obtained by dividing a traveling route from the current position to the destination, planning, by the mode planning unit, one traveling mode from a first mode of not maintaining a charge storage amount of the secondary battery having the motor apparatus as a driving source and a second mode of maintaining the charge storage amount of the secondary battery, based on a traveling load associated with the section, and if the charge storage amount of the secondary battery is above a first threshold, taking, by the mode planning unit, a section after which the charge storage amount of the secondary battery that is predicted with assumption of traveling with the first mode is below a second threshold that is less than the first threshold by taking the section being traveled by the vehicle or the next section consecutive to this section as a reference, as a first mode priority section in which the first mode is planned in priority.

According to the above aspects, if the charge storage amount of the secondary battery is above a first threshold, since a replanning of giving priority to the first mode for the section is performed, it is possible to secure almost constant free capacity in the secondary battery by actively using electric power of the secondary battery. Therefore, the energy obtained by driving the motor apparatus is prevented from being wastefully released as heat. Further, since the replanning of the traveling mode which gives priority to the first mode is only limited to before the charge storage amount of the secondary battery is below the second threshold that is less than the first threshold, a phenomena such as the first mode and the second mode are switched frequently is suppressed compared with the case of using one threshold for switching mode, for example.

In the above first aspect, the mode planning unit may also, if the charge storage amount of the secondary battery is above the first threshold when the vehicle is traveling in a high speed section requiring traveling with a high speed or a high output section requiring a high output, limit setting the high speed section or the high output section as the first mode priority section.

According to the above aspect, in a section such as the high speed section and the high output section that is not suitable for the first mode, the planning of the first mode is limited, therefore if all or most of the high speed section and the high output section is set as the second mode, for example, the planning of the traveling mode is prevented from changing greatly.

In the above first aspect, the mode planning unit may also, if the charge storage amount of the secondary battery is above the first threshold when the vehicle is traveling in the high speed section or the high output section, take at least the high speed section or the high-output section a distance to which from a current position of the vehicle is below a certain distance as a second mode priority section in which the second mode is planned in priority.

According to the above aspect, since the section the distance to which from the current position of the vehicle is below the certain distance is the second mode priority section, if all or most of the high speed section and the high output section is set as the second mode, for example, the planning of the traveling mode is prevented from changing greatly.

In the above first aspect, the mode planning unit may also, after the planning of the first mode priority section is completed, plan the first mode in an ascending order of the traveling load for the remaining section based on the charge storage amount of the secondary battery that is below the second threshold.

According to the above aspect, since the first mode is planned in the ascending order of the traveling load for the section other than the first mode priority section, it is possible to secure a constant free capacity in the secondary battery by planning the first mode priority section while improving energy efficiency in the entire traveling route.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a diagram illustrating an example of a traveling mode planned for a traveling route by the above process;

FIG. 7 is a diagram illustrating an example of the traveling mode planned for the traveling route of a comparative example;

DETAILED DESCRIPTION OF EMBODIMENTS

<First Embodiment>

A first embodiment embodying a moving assist apparatus and a moving assist method will be described below. The moving assist apparatus and the moving assist method according to this embodiment are applied to a hybrid vehicle using a motor apparatus having a secondary battery as a power source and an internal combustion engine that is driven by gasoline and other fuel as a driving source.

Figure 1:
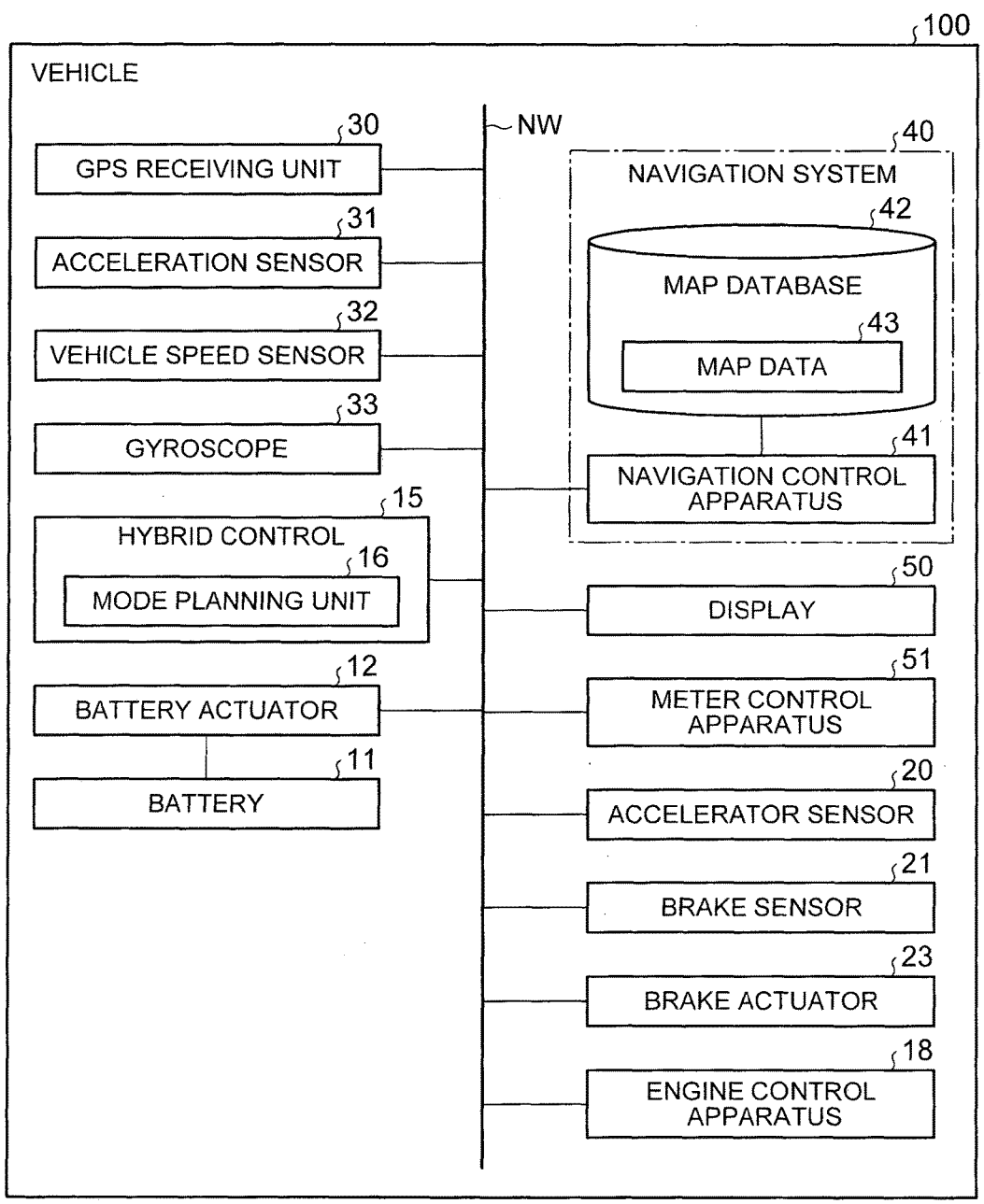
FIG. 1 is a block diagram illustrating a schematic configuration for a first embodiment of a moving assist apparatus.

As shown in FIG. 1, a vehicle 100 is provided with a battery 11 that is a secondary battery, and a battery actuator 12 for controlling charging and discharging of the battery 11. The battery 11 is a power source of a motor apparatus. The battery actuator 12 manages the charging and discharging of the battery 11 or the like. The battery 11 can be charged from a power supply outside the vehicle that is connected to an inlet which is not shown via the battery actuator 12. Further, the battery 11 is electrically connected to the motor apparatus via the battery actuator 12 or the like.

Further, the vehicle 100 is provided with a hybrid control apparatus 15 that is the moving assist apparatus, which outputs an instruction to an engine that is an internal combustion engine and the motor apparatus. The hybrid control apparatus 15 is a so-called ECU (Electronic Control Unit) that includes a computing apparatus and a storage apparatus. The computing apparatus executes programs stored in the storage apparatus and the like to perform various controls. The hybrid control apparatus 15 executes an EV traveling of using the motor apparatus as the driving source and stopping the engine and a HV traveling of using the engine and the motor apparatus.

The hybrid control apparatus 15 is connected to the battery actuator 12 via a onboard network NW to obtain a state of charge (SOC) from the battery actuator 12.

The hybrid control apparatus 15 suitably selects a CD (Charge Depleting) mode that is a first mode of not maintaining the state of charge (charge storage amount) of the battery 11 and a CS (Charge Sustaining) mode that is a second mode of maintaining the state of charge of the battery 11.

The CD mode is a mode of actively consuming electric power charged into the battery 11, and is a mode of giving priority to the EV traveling. Hereinafter this CD mode will be described as an EV mode. Note that, even in the EV mode, if an accelerator pedal is largely depressed for a large vehicle power, the engine will be driven.

The CS mode is a mode of maintaining the state of charge (charge storage amount) of the battery 11 in a predetermined range with respect to a reference value, and is a mode of giving priority to the HV traveling of driving the engine and enabling a regeneration operation of the motor apparatus as required in order to maintain the battery 11. Hereinafter this CS mode will be described as an HV mode. Note that, even in the HV mode, if the state of charge of the battery 11 is above the reference value, the engine is stopped. The reference value of the HV mode is suitably set as a value of the state of charge when it is changed from the EV mode to the HV mode, or a value of the state of charge required for maintaining performance of the battery 11.

Further, the vehicle 100 is provided with an accelerator sensor 20 for detecting an operation amount by a driver to the accelerator pedal, and a brake sensor 107 for detecting an operation amount by the driver to a brake pedal. Further, the vehicle 100 is provided with a brake actuator 23 for controlling the brake. The accelerator sensor 20, the brake sensor 21 and the brake actuator 23 are connected to the hybrid control apparatus 15 via the onboard network NW.

Further, via the onboard network NW, the vehicle 100 is provided with, for example, a GPS (Global Positioning System) receiving unit 30, an acceleration sensor 31, a vehicle speed sensor 32, a gyroscope 33 and the like. The GPS receiving unit 30 receives a radio signal transmitted from a GPS satellite, and detects latitude and longitude of a position of the vehicle 100 based on the received radio signal. The acceleration sensor 31 detects an acceleration of the vehicle 100. The vehicle speed sensor 32 detects a rotating speed of a wheel of the vehicle 100. The gyroscope 33 detects a relative orientation of the vehicle 100. Various signals output from the GPS receiving unit 30, the acceleration sensor 31, the vehicle speed sensor 32, and the gyroscope 33 are input to the hybrid control apparatus 15.

The hybrid control apparatus 15 determines a distribution of a driving force (output ratio) of the engine and the motor apparatus based on the detection results of the acceleration sensor 31, the vehicle speed sensor 32 and the accelerator sensor 20, for example. The distribution of the driving force also includes the case where the engine is stopped to set a distribution ratio of the driving force to "0". Moreover, it outputs a control instruction to the battery actuator 12 based on the distribution of the driving force, generates information related to a control amount of the engine and outputs the information to an engine control apparatus 18.

Further, the hybrid control apparatus 15 determines a distribution of a braking force of the brake and the motor apparatus based on the detection results of the acceleration sensor 31, the vehicle speed sensor 32 and the brake sensor 21, for example. The distribution of the braking force also includes the case where a distribution ratio of the brake is set to "0", and the case where a distribution ratio of the motor apparatus is set to "0". Moreover, it outputs an instruction to the brake actuator 23 and the battery actuator 12 based on the distribution of the braking force. If the braking force is distributed to the motor apparatus, the motor apparatus generates a regenerative braking to function as a generator. The kinetic energy generated by the motor apparatus is converted to a current for charging the battery 11. Further, in this embodiment, the vehicle 100 can perform the regenerative braking in any one of the EV mode and the HV mode.

The vehicle 100 is mounted with a navigation system 40 for performing route guidance and the like. The navigation system 40 includes a navigation control apparatus 41 and a map database 42. The navigation control apparatus 41 is connected to the onboard network NW, and detects absolute coordinates of a current position based on a signal input from the GPS receiving unit 30. The navigation control apparatus 41 further detects a relative position of the vehicle through autonomous navigation based on signals input from the vehicle speed sensor 32 and the gyroscope 33, and identifies the position of the vehicle 100 based on the relative position and the absolute coordinates. Further, when a destination is set by the driver, the navigation control apparatus 41 searches for a route from the current position to the destination by using map data.

The map data 43 is stored in the map database 42. The map data 43 includes node data related to a node and link data related to a link that is set between the nodes. The node on a road is set as a position of particular traffic element such as an intersection, a traffic light and a curve, or a position where the number of lanes is changed and the like. The node data includes for example, an identifier of the node, coordinates of the node, road attribute information of the node. The road attribute information includes a road type such as a highway, a national road, and a general road.

Figure 2:
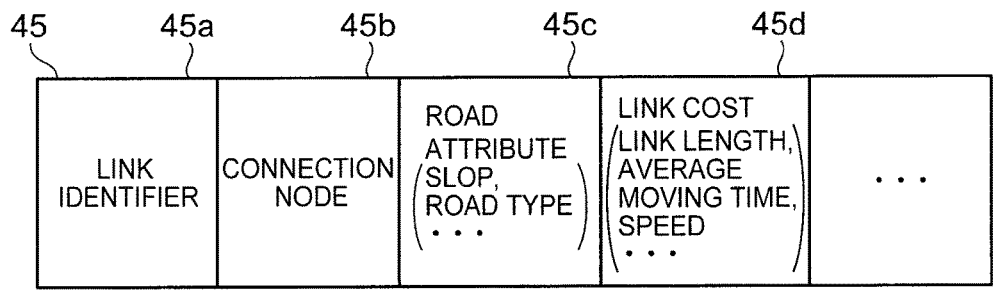
FIG. 2 is a diagram illustrating a data structure of link data in the embodiment.

As shown in FIG. 2, the link data 45 includes a link identifier 45a, a connection node 45b, a road attribute 45c, and a link cost 45d. The link identifier 45a is an identifier assigned to each link, and the connection node 45b is an identifier of a node connected to both ends of the link. The road attribute 45c includes for example a slope (vertical slope), the road types such as the highway, the national and the general road, and the like. The link cost 45d includes a link length, an average traveling time to complete the link, information related to speed such as a legal speed or an average speed, and the like. If the destination is set, the navigation control apparatus 41 searches for the traveling route from the current position to the destination by using the node data and the link data 45.

Figure 3:
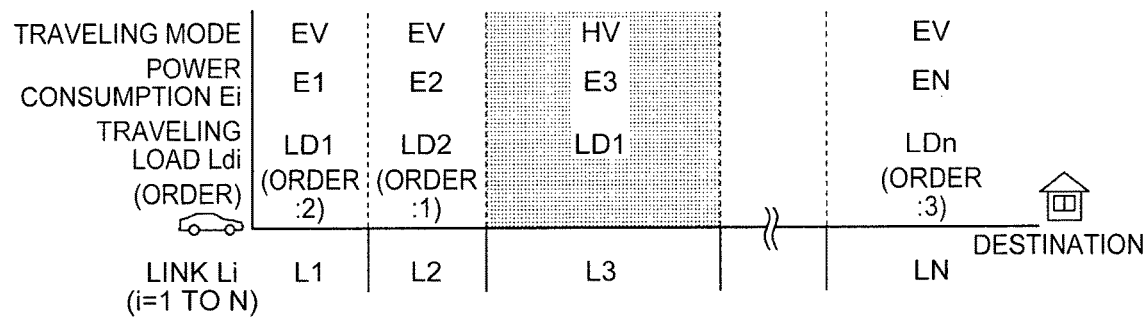
FIG. 3 is a diagram illustrating power consumption, a traveling load, a traveling mode that are associated with a link in the embodiment.

As shown in FIG. 3, if the traveling route is searched, the navigation control apparatus 41 uses the road attribute 45c and the link cost 45d to calculate a traveling load Ldi (i=1,2 . . . , n) for each of a plurality sections obtained by dividing the traveling route. In this embodiment, the section that is the target for which the traveling load Ldi is calculated is the link Li (i=1,2 . . . , n) that is associated with the traveling route. Further, the traveling load Ldi indicates a magnitude of the load (energy) per unit distance in the link by a relative numeric value. For example, the traveling load Ldi may be a value indicating for example the load on the engine during traveling-only by the engine, or a value indicating the load on the motor apparatus during traveling only by the motor apparatus. Further, the traveling load Ldi may be a value that is calculated based on a preset equation, or a value with which the magnitude of the load of the driving source is divided into a plurality of levels. For example, in a section such as an upslope where a high output is required, the traveling load Ldi is larger compared with a flat section, and in a section such as a highway that is traveled with a high speed, the traveling load Ldi is larger compared with a section of city.

The navigation control apparatus 41 outputs a link ID corresponding to a link of the route ahead in the traveling direction of the vehicle 100 and the traveling load Ldi, the road attribute 45c and the link cost 45d of the link to the hybrid control apparatus 15.

If this information from the navigation control apparatus 41 is input to the hybrid control apparatus 15, the hybrid control apparatus 15 calculates, for each link, power consumption Ei of the battery 11 required to complete the link with the EV mode based on the road attribute 45c and the link cost 45d. In this case, the hybrid control apparatus 15 may calculates the power consumption Ei by using the traveling load Ldi that is input from the navigation control apparatus 41.

Further, the hybrid control apparatus 15 plans the traveling mode for the link. Allocation of the traveling mode is performed by a mode planning unit 16 (see FIG. 1). In general, a trend to improve entire energy efficiency is exhibited when the EV mode is applied to the section of a small traveling load Ldi. Also, a trend to improve entire energy efficiency is exhibited when the traveling by the engine is applied to the section of a large traveling load Ldi. Therefore, in this embodiment, when it is possible to travel through the entire traveling route to the destination with the EV mode, the EV mode is planned for the entire traveling route. However, when it is impossible to plan as such, the EV mode is allocated to the section of a small traveling load, and the HV mode is allocated to the section of a large traveling load.

Further, in this embodiment, the traveling mode is planned to be the EV mode in priority substantially when a remaining amount of the battery is large. Therefore, the mode planning unit 16 performs an arrangement in an ascending order of the traveling load Ldi, plans the section that is traveled with the EV mode and the remaining section that is traveled with the HV mode in accordance with this order. When planning the traveling mode, the hybrid control apparatus 15 outputs an instruction to the battery actuator 12, the engine control apparatus 18, and the motor apparatus based on the planning.

Further, as shown in FIG. 1, the vehicle 100 is provided with a display 50 for displaying the searched route together with a map, and a meter display control apparatus 51 for controlling meter display of an instrument panel. The meter display control apparatus 51 obtains the SOC of the battery 11, charging and discharging information about whether the battery 11 is in a discharging state or a charging state, and the like via the onboard network NW, and visually displays an energy flow of the vehicle 100 based on the charging and discharging information. The energy flow refers to a flow of energy caused by the charging and discharging of the battery 11, the driving/regeneration of the motor apparatus, and the like.

Figure 4:
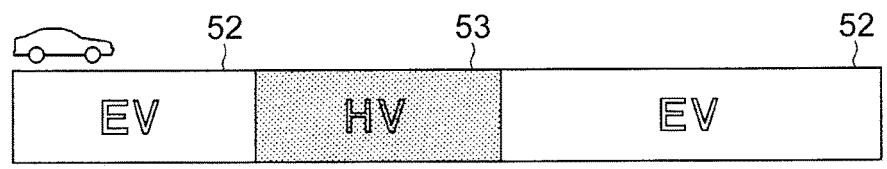
FIG. 4 is a diagram illustrating a display example of the traveling mode displayed on a display in the embodiment.

As shown in FIG. 4, the mode planning unit 16 outputs the planned traveling mode to the display 50 as an EV mode indication 52 and a HV mode indication 53. The EV mode indication 52 indicates a length of the section for which the EV mode is planned, and the HV mode indication 53 indicates a length of the section for which the HV mode is planned. Further, for the traveling route, when only the EV mode is planned, only the EV mode indication 52 is displayed, and when only the HV mode is planned, only the HV mode indication 53 is displayed.

Next, a traveling mode planning process that is performed by the mode planning unit 16 of the hybrid control apparatus 15 and the effect thereof will be described. The mode planning unit 16 repeats the process in a substantially constant period.

(Planning of Traveling Mode in Initial Stage)

If the destination is set through the navigation system 40 at a departure position (current position), the navigation control apparatus 41 searches for a traveling route from the current position to the destination by using the map data 43. If the traveling route to the destination is set, the navigation control apparatus 41 outputs the link ID of the link associated with the traveling route, the traveling load Ldi that is calculated for each link, a road attribute 45c and the link cost 45d to the hybrid control apparatus 15.

Firstly, the case where the traveling mode has not been planned for all links will be described. The link ID, the traveling load Ldi, the road attribute 45c and the link cost 45d as well as the SOC from the battery actuator 12 are input to the mode planning unit 16. At this time, the SOC is converted into an electric power amount stored in the battery 11 (remaining amount of the battery) based on the battery capacity.

Further, the mode planning unit 16 calculates power consumption Ei required to complete the link by using the road attribute 45c and the link cost 45d. When calculating the power consumption Ei, the mode planning unit 16 calculates a total sum $\Sigma Ei$ (i=1 to N) of the power consumption Ei of all links. Moreover, it compares an available remaining amount of the battery with the total sum $\Sigma Ei$ to determine whether it is possible to complete the entire traveling route with the EV mode. The available remaining amount of the battery refers to a charge storage amount from a lower limit value of the remaining amount of the battery to a remaining amount of the battery based on the SOC. If it is possible to complete the entire traveling route with the EV mode, the EV mode is planned for the entire traveling route.

If it is impossible to complete the entire traveling route with the EV mode, it is necessary to plan the EV mode and the HV mode for the traveling route. Therefore, the mode planning unit 16 allocates the remaining amount of the battery to each link in an ascending order of the traveling load Ldi.

As shown in FIG. 3, for example, the EV mode is planned for a link L2 of the smallest traveling load Ldi, and power consumption E2 required to complete the link L2 is subtracted from the remaining amount of the battery. Then, the EV mode is planned for the next link L1 in the order, and power consumption E1 required to complete the link L1 is subtracted from the remaining amount of the battery.

In this way, the EV mode continues to be planned until the remaining amount of the battery reaches the lower limit value or the remaining amount of the battery becomes less than the power consumption Ei of the next link in the order. Herein, the link for which the EV mode is planned in the ascending order of the traveling load Ldi based on the remaining amount of the battery is called as an EV planning section. If the planning for the EV planning section is completed, the mode planning unit 16 plans the HV mode for the link other than the EV planning section out of the links associated with the traveling route from the departure position to the destination. Herein, the link other than the EV planning section for which the HV mode is planned is called as an HV planning section.

Thus, at the time when the traveling route is set, the EV planning section and the HV planning section are planned, and even the engine and the motor apparatus are driven based on the planning, there is the case where a variation of the remaining amount of the battery is different from that predicted depending on an actual traffic flow, the vertical slope of the road and the like. Therefore, the mode planning unit 16 replans the traveling mode in a substantially constant period in the same manner as the planning of the traveling mode in the initial stage as described above.

On the other hand, for example, in the case where the remaining amount of the battery is charged above that predicted, such as the regenerative braking is generated in a section with much downslope, and in the case where the remaining amount of the battery is fully charged, it is also assumed that the energy obtained by the regenerative braking can not be recovered by the battery 11 and is released as heat. Therefore, the mode planning unit 16 of the hybrid control apparatus 15 exceptionally performs a replanning to actively consume the electric power of the battery 11 in a different manner from the replanning that is performed by the method described above, when the remaining amount of the battery is close to full charging.

(Replanning of Traveling Mode)

Figure 5:
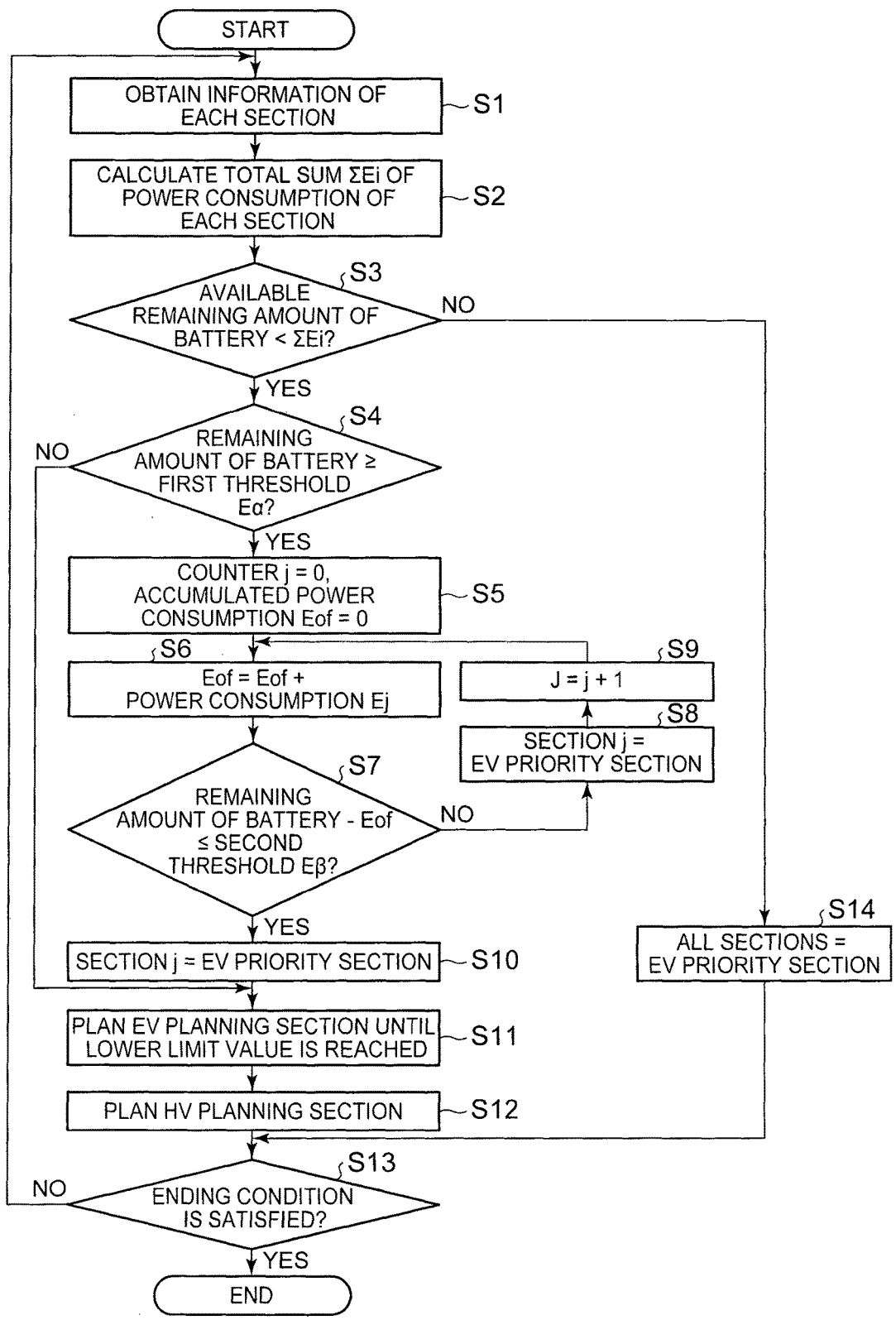
FIG. 5 is a flowchart illustrating a traveling mode planning process in the embodiment.

Next, with reference to FIG. 5, a replanning process performed when the remaining amount of the battery is close to full charging will be described together with the replanning process performed with a constant period.

The mode planning unit 16 obtains information about the link (section) associated with the traveling route from the current position to the destination (Step S1). Here the obtained information is the link ID associated with the traveling route ahead in the traveling direction of the vehicle 100, the traveling load Ldi, the road attribute 45c and the link cost 45d.

Next, the mode planning unit 16 calculates the power consumption Ei for each link based on the road attribute 45c, the link cost 45d and the like, and calculates the total sum ΣEi of the power consumption Ei by adding the calculated power consumption Ei (Step S2). The total sum ΣEi is an electric power amount to be consumed that is predicted in the case of traveling through the route from the current position to the destination only with the EV mode. Further, the mode planning unit 16 determines whether the total sum ΣEi of the power consumption Ei is larger than the above available remaining amount of the battery (Step S3).

If it is determined that the available remaining amount of the battery is above the total sum ΣEi of the power consumption Ei (Step S3: NO), that is; the entire traveling route can be traveled with the EV mode, thus the mode planning unit 16 plans all the links to be an EV priority section that is a first mode priority section (Step S14).

Then the mode planning unit 16 determines whether an ending condition is satisfied (Step S13). The ending condition is that the vehicle 100 has arrived at the destination, the route guidance is interrupted, and the like. If it is determined that the ending condition is satisfied (Step S13: NO), the process returns to step S1.

In step S3, if it is determined that the available remaining amount of the battery is less than the total sum ΣEi of the power consumption Ei (Step S3: YES), a part of the traveling route can be traveled with the EV mode, but the rest needs to be traveled with the HV mode. In this case, firstly, the mode planning unit 16 determines whether the remaining amount of the battery is above a first threshold Eα (Step S4). The first threshold Eα is a value close to the charge storage amount when the battery 11 is fully charged (SOC 100%), and is set as the remaining amount of the battery when the SOC is 90% for example. That is, in step S4, when the regenerative braking is generated, it is determined whether a free capacity can be secured in the battery 11 for the energy recovered from the motor apparatus.

If it is determined that the remaining amount of the battery is less than the first threshold Eα (Step S4: NO), the traveling mode is planned as in the initial stage. That is, the remaining amount of the battery is allocated to each link while the EV mode planning section is planned in the ascending order of the traveling load Ldi until the lower limit value is reached (Step S11), and if the remaining amount of the battery is not allocated when the lower limit value is reached, the remaining link is taken as the HV planning section (Step S12). Thus, when the variation of the remaining amount of the battery is relatively gentle, even the remaining amount of the battery is increasing, the HV planning section becomes the EV planning section by performing the replanning to prevent the remaining amount of the battery from being above the first threshold Eα.

On the other hand, if the downslope is continuous or a deceleration is performed frequently, there may be a case where the remaining amount of the battery rapidly increases, and the remaining amount of the battery is above the first threshold Eα. In such a case, if the mode planning unit 16 determines that the remaining amount of the battery is above the first threshold Eα (Step S4: YES), the mode planning unit 16 sets a link counter j and accumulated power consumption Eof that is obtained by accumulating power consumption Ej of each link Lj when it is assumed to travel with the EV mode from the current position to "0" in order to be initialized (Step S5). The link counter j takes the current position as a reference in such a manner that it is "0" for the link being currently traveled, "1" for the next link, "2" for the next one to the next link, and so on, to associate with the previous consecutive link.

Then, the mode planning unit 16 adds the accumulated power consumption Eof to the power consumption Ej of the link corresponding to the counter j, as a new accumulated power consumption Eof (Step S6). For example, if the counter j is set to "0", the accumulated power consumption Eof is taken as power consumption E0 (Ej) from the current position to an end point of the link. In this case, the power consumption E0 is calculated by multiplying a ratio of a route length to the end point of the link to the link length by the power consumption of the entire link.

Further, the mode planning unit 16 determines whether a value obtained by subtracting the accumulated power consumption Eof from the remaining amount of the battery is below a second threshold Eβ (Step S7). The second threshold Eβ is a value that is larger than the lower limit value and less than the first threshold Eα. Further, the second threshold Eβ is set through experiments, statistics and the like, such that even the battery 11 is charged by the regenerative braking that is generated in the downslope or the like, the battery 11 is not fully charged immediately after the charging. For example, the second threshold Eβ is set as the remaining amount of the battery when the SOC is 80%. Note that this second threshold Eβ may be changed depending on an amount of the downslope of the road or the like.

If it is determined that the value obtained by subtracting the accumulated power consumption Eof from the remaining amount of the battery is lager than the second threshold Eβ (Step S7: NO), it is possible to travel with the EV mode at least before an end point of the link Lj corresponding to the counter j is reached. Therefore, the link Lj is taken as the EV priority section (Step S8), the counter j is incremented by 1 (Step S9), and the process returns to step S6. The EV priority section is different from the EV planning section which is planned by allocating the available remaining amount of the battery to each link in the ascending order of the traveling load Ldi, and refers to a section that is planned to give priority to the EV mode in order to secure a free capacity of the battery 11 for recovering regenerative energy. By applying the EV mode priority section, a substantially constant free capacity is secured in the battery 11, and therefore a percentage of energy obtained by the regenerative braking that is recovered to the battery 11 can be improved.

Then, the mode planning unit 16 repeats steps S6 to S9 as described above until the value obtained by subtracting the accumulated power consumption Eof from the remaining amount of the battery is below the second threshold Eβ. As a result, the accumulated power consumption Eof is a value obtained by adding the power consumption Ei of a plurality consecutive links Lj all of which are the EV priority section. Further, before the value obtained by subtracting the accumulated power consumption Eof from the remaining amount of the battery is below the second threshold Eβ, the HV planning section is replanned to be the EV priority section, the EV planning section becomes the EV priority section, and thus the EV mode is maintained.

When the value obtained by subtracting the accumulated power consumption Eof from the remaining amount of the battery is below the second threshold Eβ (Step S7: YES), the remaining amount of the battery is predicted to be below the second threshold Eβ by traveling with the EV mode to the link Lj corresponding to the counter j. Therefore, the mode planning unit 16 sets the link Lj as the EV priority section (Step S10). Thus, the EV priority section is from the link being currently traveled to the link Lj.

If the EV priority section is set, the mode planning unit 16, based on a new remaining amount of the battery obtained by subtracting the accumulated power consumption Eof from the current remaining amount of the battery, allocates the EV mode in the ascending order of the traveling load Ldi for the link other than the EV priority section, and takes the link as the above EV planning section (Step S11).

Then the mode planning unit 16 allocates the HV mode for the link other than the EV priority section and the EV planning section (Step S12). Then, the process as described above is repeated in a substantially constant period until the ending condition is satisfied.

Next, with reference to FIGS. 6 and 7, the effect of the moving assist apparatus and the moving assist method of this embodiment will be described. As shown in FIG. 6, in this embodiment, when the remaining amount of the battery is above the first threshold $E\alpha$, the EV priority section is set from the position of the vehicle 100 at that time (current position) to actively consume the electric power until the remaining amount of the battery is below the second threshold $E\beta$. For example, even the current position is included in the link of the HV planning section, the link is set as the EV priority section. Therefore, it is possible to secure a free capacity in the battery 11 near an end point of the EV priority section, which is substantially equal to "the first threshold $E\alpha$— the second threshold $E\beta$" for recovering the electric power obtained by the regenerative braking. Therefore, it is possible to prevent the energy obtained by the regenerative braking from being released as heat by fully charging the battery 11. Furthermore, it is possible to prevent the planned traveling mode from being switched frequently by having a width between the first threshold $E\alpha$ and the second threshold $E\beta$.

That is, as shown in FIG. 7, when the second threshold $E\beta$ is set as the same value as the first threshold $E\alpha$, since the remaining amount of the battery is above the first threshold $E\alpha$ and the EV priority section is set, actually the remaining amount of the battery is less than the first threshold $E\alpha$ near the end point of the EV priority section. In this case, depending on the traveling load of the next section, there is possibility that the HV mode is set. After the next section is traveled with the HV mode, if the battery 11 is charged by the regenerative braking, the remaining amount of the battery may reach the first threshold $E\alpha$ soon after the first threshold $E\alpha$ is reached, and therefore it switches to the EV mode again. Thus, when the remaining amount of the battery varies in the vicinity of the first threshold $E\alpha$, the traveling mode may be switched frequently.

However, the traveling mode may not be switched frequently by having the width between the first threshold $E\alpha$ and the second threshold $E\beta$ as in this embodiment, and therefore the indications 52 and 53 that are displayed on the display 50 may not be changed frequently. Thus, it is possible to prevent a user from feeling annoyance due to the frequent switching of the traveling mode.

As described above, according to this embodiment, it is possible to achieve the following effects. (1) When the remaining amount of the battery 11 is above the first threshold $E\alpha$, since the replanning of giving priority to the EV mode for the link is performed, it is possible to secure almost constant free capacity in the battery 11 by actively using the electric power of the battery 11. Therefore, the regenerative energy obtained by driving the motor apparatus is prevented from being wastefully released as heat. Further, since the replanning of the traveling mode which gives priority to the EV mode is limited to before the remaining amount of the battery is below the second threshold $E\beta$ that is less than the first threshold $E\alpha$, a phenomena that the EV mode and the HV mode are switched frequently is suppressed compared with the case of using one threshold for switching mode, for example.

(2) In the replanning when the remaining amount of the battery is above the first threshold $E\alpha$, after the planning of the EV priority section is completed, since the EV planning section is replanned, it is possible to secure the substantially constant free capacity in the battery 11 by the planning of the EV priority section and increase the energy efficiency of the entire traveling route.

<Second Embodiment>

Next, a second embodiment embodying the moving assist apparatus and the moving assist method will be mainly described by the difference from the first embodiment. Further, the moving assist apparatus and the moving assist method according to this embodiment is different from the first embodiment only in the operation of the mode planning unit 16. In the drawings, substantially the same elements as those in the first embodiment are denoted by the same reference numbers, and the duplicate description will be omitted.

Figure 8:
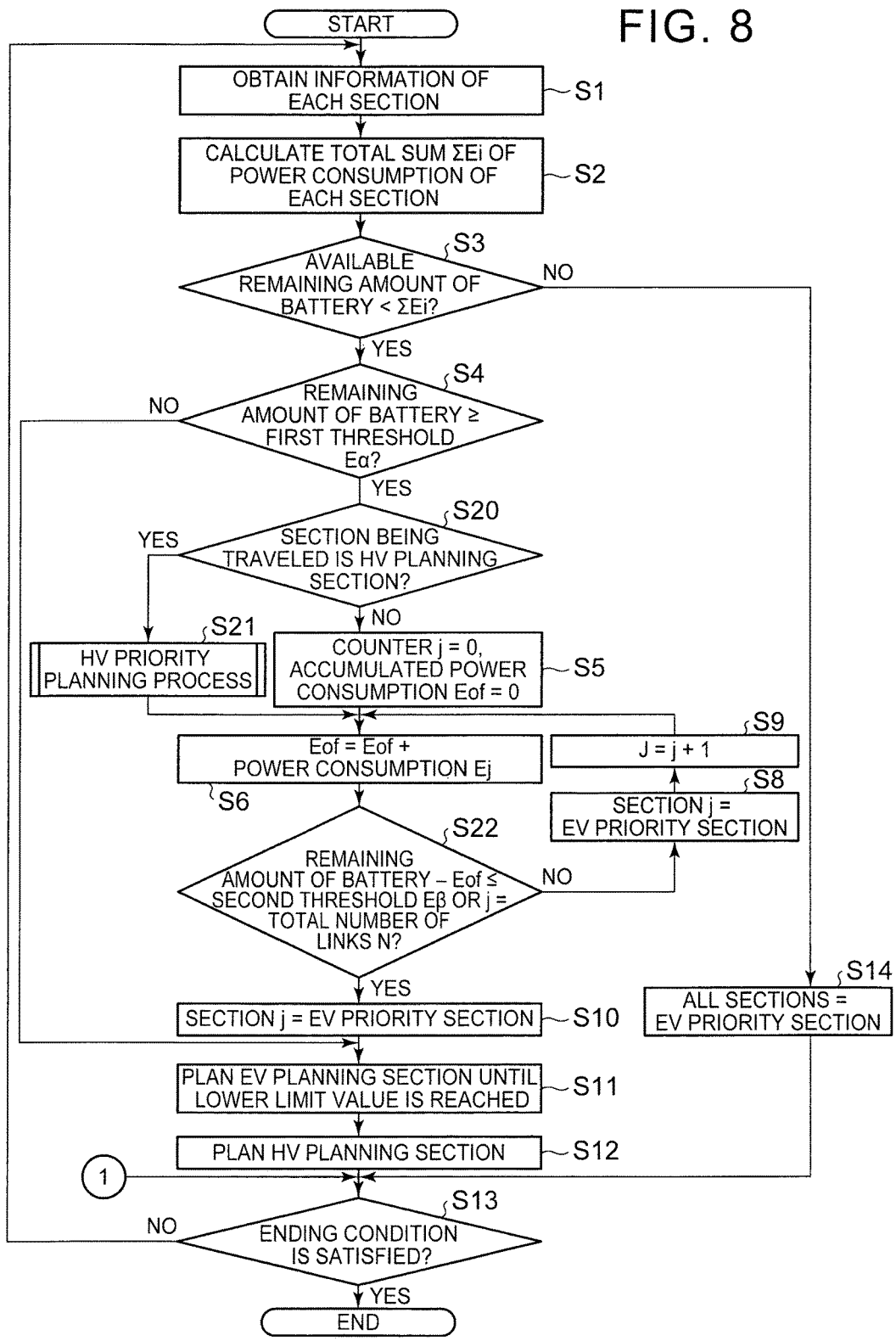
FIG. 8 is a flowchart illustrating a traveling mode planning process in a second embodiment of the moving assist apparatus.
Figure 9:
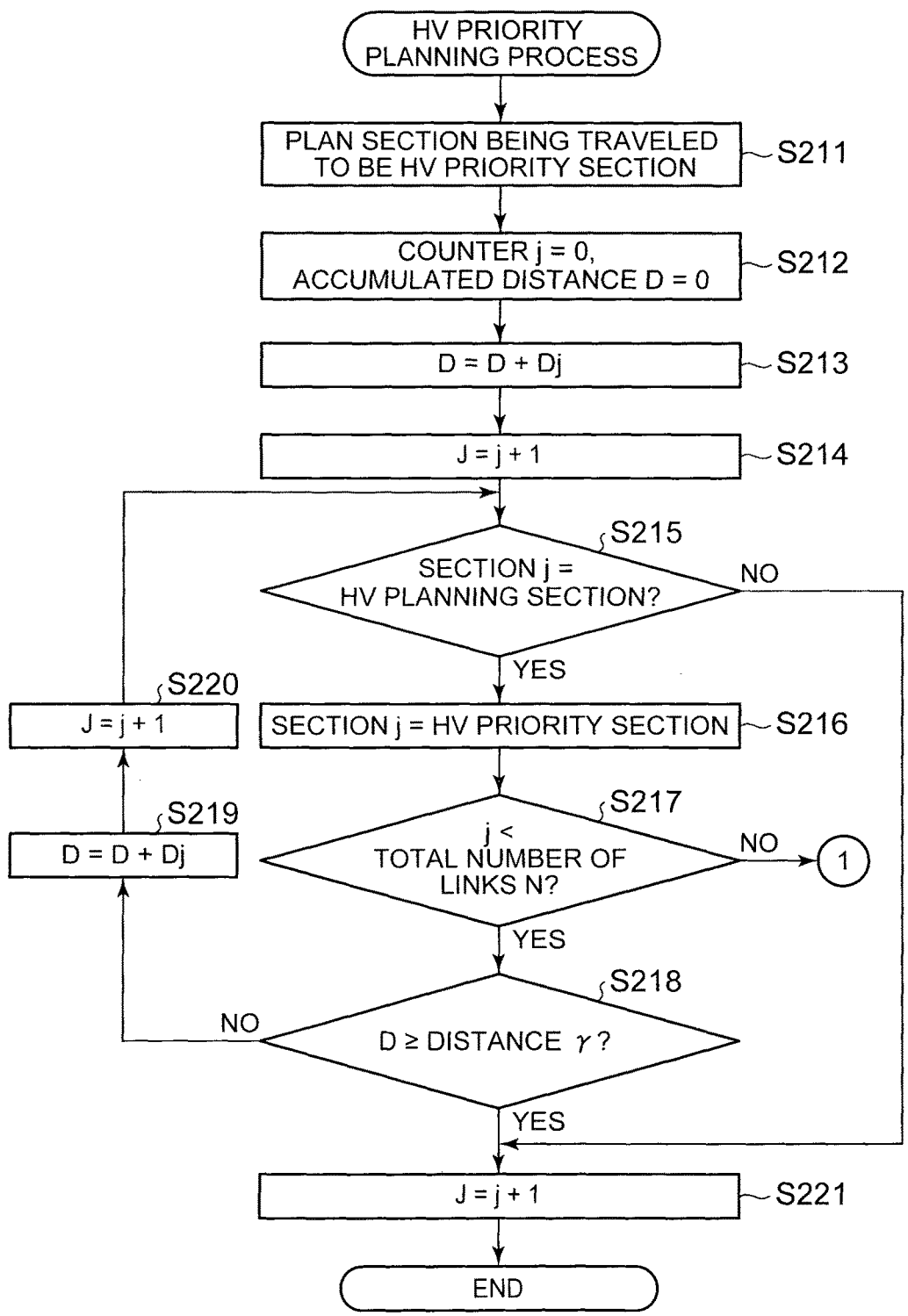
FIG. 9 is a flowchart illustrating a HV priority planning process included in the process.

With reference to FIGS. 8 and 9, a traveling mode replanning process will be described. This process is performed in a substantially constant period. As shown in FIG. 8, as in the first embodiment, the mode planning unit 16 obtains information about the link (section) associated with the traveling route from the current position to the destination (Step S1). Further, the mode planning unit 16 calculates the power consumption Ei for each link, and calculates the total sum $\Sigma$Ei of the power consumption Ei (Step S2), and determines whether the available remaining amount of the battery is less than the total sum $\Sigma$Ei of the power consumption Ei (Step S3). If it is determined that the available remaining amount of the battery is above the total sum $\Sigma$Ei of the power consumption Ei (Step S3: NO), all the links are planned to be the EV priority section (Step S14).

Further, if it is determined that the available remaining amount of the battery is less than the total sum $\Sigma$Ei of the power consumption Ei (Step S3: YES), the mode planning unit 16 determines whether the remaining amount of the battery is above the first threshold $E\alpha$ (Step S4). If it is determined that the remaining amount of the battery is less than the first threshold $E\alpha$ (Step S4: NO), the traveling mode is replanned as the planning of the traveling mode in the initial stage as described above (Steps S11 to S13).

On the other hand, if it is determined that the remaining amount of the battery is above the first threshold $E\alpha$ (Step S4: YES), the mode planning unit 16 determines whether the link being currently traveled by vehicle 100 is the HV planning section based on the planning that is calculated in the previous period (Step S20).

If it is determined that the link being currently traveled by vehicle 100 is not the HV planning section (Step S20: NO), the counter j and the accumulated power consumption Eof are initialized (Step S5). Moreover, before the value obtained by subtracting the accumulated power consumption Eof from the remaining amount of the battery is below the second threshold $E\beta$ or the value set in the counter j indicates a total number N of links from the current position to the destination, the link Lj is planned to be the EV priority section (Step S6 to S9, Step S22). Here the method of planning the EV priority section is the same as that of the first embodiment. Thus, if there is the HV planning section in the sections after which the value obtained by subtracting the accumulated power consumption Eof from the remaining amount of the battery is below the second threshold Eβ, the section is planned to be the EV priority section.

Then, if the value obtained by subtracting the accumulated power consumption Eof from the remaining amount of the battery is below the second threshold Eβ or if the value set in the counter j is equal to the total number N of links (Step S22: YES), the mode planning unit 16 sets the link Lj as the EV priority section as in the first embodiment (Step S10). In addition, the mode planning unit 16 plans the EV planning section (Step S11), and plans the HV planning section (Step S12). In addition, when no link shall be planned to be the EV planning section or the HV planning section, it is not necessary to be planned.

On the other hand, when the link being currently traveled by vehicle 100 is the HV planning section (Step S20: YES), a HV priority planning process of setting the section after which a distance from the current position of the vehicle 100 is above a certain distance as the HV priority section that is the second mode priority section is performed (Step S21). Further, in this embodiment, the HV planning section is a section that is planned when the remaining amount of the battery is less than the first threshold Eα, and the HV priority section is a section that is planned when the remaining amount of the battery is above a first threshold Eα. Although they are described for the convenience of distinguishing, the HV mode is planned for both sections.

This HV priority planning process will be described. For example, if it is impossible to travel through the entire route to the destination with the EV mode, the HV mode is planned for the high speed section and the high output section such as the highway and the upslope. When the vehicle 100 is traveling on the highway with the HV mode, the traveling mode of the highway section displayed on the display 50 is also the HV mode indication. Here, when the remaining amount of the battery is above the first threshold Eα, the HV mode is switched to the EV mode, and if most of the highway section displayed on the display 50 is the EV mode indication 52, the driver may feel that the planning have been changed significantly and feel discomfort. Therefore, even the vehicle 100 is traveling in the HV planning section, a section having the certain distance from the current position is maintained to the HV mode, and the section before this section, even it is the highway, is switched to the EV mode, in order to maintain an excellent balance of planning stability and energy efficiency.

With reference to FIG. 9, the HV priority planning process will be described in combination with the operation of the mode planning unit 16. Firstly, the mode planning unit 16 plans the link being traveled to be the HV priority section (Step S211). That is, the HV mode is maintained to be the traveling mode associated with the link Lj. Further, the mode planning unit 16 sets the link counter j and an accumulated distance D that is an accumulated value of a length of the HV priority section as "0" in order to be initialized (Step S212).

Further, the mode planning unit 16 obtains a new accumulated distance D by adding a link length Dj that is a distance from the current position to the end point of the link to the accumulated distance D (Step S213), and increments the counter j by 1 (Step S214).

Further, the mode planning unit 16 determines whether the link Lj corresponding to the counter j is the HV planning section (Step S215). That is, if the value set in the counter j is "1", it determines whether the next link that is consecutive to the link being currently traveled is the HV planning section.

If it is determined that the link Lj corresponding to the counter j is not the HV planning section (Step S215: NO), the process proceeds to step S221, in which the mode planning unit 16 increments the counter j by 1 in order to perform the determination on the next link as a target, and ends the HV priority planning process. Then, the process proceeds to step S6 as described above (see FIG. 8), and before the value obtained by subtracting the accumulated power consumption Eof from the remaining amount of the battery is below the second threshold Eβ or the value set in the counter j is the total number N of links, the link Lj is planned to be the EV priority section (Step S6 to S9, Step S22).

In step S215, if it is determined that the link Lj corresponding to the counter j is the HV planning section (Step S215: YES), the mode planning unit 16 takes the link Lj that is planned to be the HV planning section as the HV priority section (Step S216). That is, the HV mode is maintained to be the traveling mode associated with the link Lj.

Then, the mode planning unit 16 determines whether the value set in the counter j is less than the total number N of links (Step S217). Here, if it is determined that the value set in the counter j is equal to the total number N of links (Step S217: NO), the planning of the link is completed in a state where all the route from the current position to the destination is the HV priority section, and thus the process proceeds to step S13 as described above to determine whether the ending condition is satisfied.

If it is determined that the value set in the counter j is less than the total number N of links (Step S217: YES), the mode planning unit 16 determines whether the accumulated distance D is above a HV priority distance γ (Step S218). The HV priority distance γ is set as such a distance that when the EV planning section a distance to which from the current position is at least below the HV priority distance γ is planned to be the HV mode and the HV planning section there before is changed to the EV mode, the excellent balance of planning stability and energy efficiency can be maintained. For example, the HV priority distance γ may be a fixed value such as 80 km. Alternatively, the HV priority distance γ may be a variable value that varies depending on the length of the traveling route, such as a distance corresponding to half of the HV planning section that is continuous from the current position, or varies depending on the vehicle state such as speed and acceleration. Alternatively, it is possible to learn preferences of the user by the navigation control apparatus 41 and the like and change the HV priority distance γ according to the preferences.

If it is determined that the accumulated distance D is less than the HV priority distance γ (Step S218: NO), a new accumulated distance D is obtained by adding the link length Dj of the link Lj corresponding to the counter j to the accumulated distance D (Step S219), the counter j is incremented by 1 (Step S220), and the process returns to step S215.

If it is determined that the accumulated distance D is above the HV priority distance γ (Step S218: NO), in order to perform the determination on the next link as a target, the counter j is incremented by 1 (Step S221), the. HV priority planning process ends, and the process proceeds to step S6. Then, before the value obtained by subtracting the accumulated power consumption Eof from the remaining amount of the battery is below the second threshold Eβ or the value set in the counter j is the total number N of links, the link Lj is planned to be the EV priority section (Step S6 to S9, Step S22). In addition, the section that is planned to be the HV priority section is processed as the HV planning section in the replanning in the next period.

Figure 10:
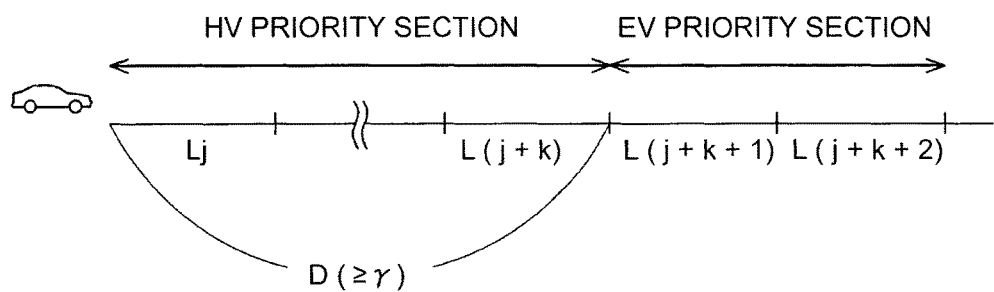
FIG. 10 is a diagram illustrating an example of a traveling mode planned for a traveling route by the above process.

Next, with reference to FIGS. 10 and 11, the effect of the moving assist apparatus and the moving assist method of this embodiment will be described. As shown in FIG. 10, for example, in the case that the remaining amount of the battery is above the first threshold Eα when the vehicle 100 is traveling in the highway, the HV mode is planned for the highway, and therefore the section after which the accumulated distance D from the current position is above the HV priority distance γ (link Lj to link Lj+k) is the HV priority section. Also, in the case that the traveling route before the HV priority section is also the highway, the planning ends before the remaining amount of the battery is below the second threshold Eβ or the destination, regardless of whether it is the highway or the upslope, it is the EV priority section. Even the HV priority section and the EV priority section are planned, if there is a remaining route to the destination, the section is the EV planning section or the HV planning section as in the first embodiment.

Thus, even the remaining amount of the battery is above the first threshold Eα in the highway or the like, a distance of about the HV priority distance γ is taken as the HV priority section, and thus the planning of the traveling mode is prevented from being changed greatly.

Figure 11A:
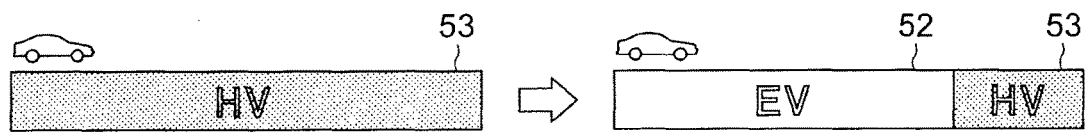
FIG. 11A is a diagram illustrating a display example of the traveling mode in the embodiment.

That is, as shown on the left side of FIG. 11A, the HV mode is substantially set for the highway or the like. Thus, for example, as shown on the right side of FIG. 11A, when the remaining amount of the battery is above the first threshold Eα during traveling in the highway, if most of the HV mode indication 53 is changed to the EV mode indication, 52, the driver may feel that the planning has been changed significantly. Further, during traveling with the HV mode, if it is switched suddenly to the EV mode, the driver may feel that the planning has been changed suddenly and feel discomfort.

Figure 11B:
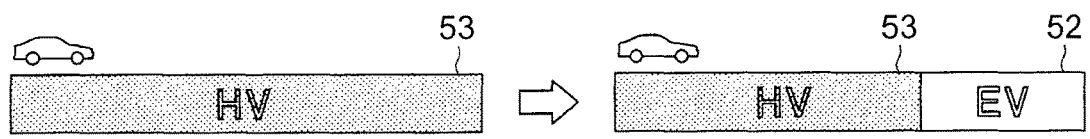
FIG. 11B is a diagram illustrating a display example of the traveling mode in a comparative example.

On the other hand, as shown on the right side of FIG. 11B, if a distance of about the HV priority distance γ from the current position is taken as the HV priority section, compared with the case of traveling with the EV mode from the current value until the remaining amount of the battery is below the second threshold Eβ, the degree of change in the planning is lowered, and the planning may not be changed suddenly. For this reason, the driver may not fell the discomfort.

As described above, according to this embodiment, except for the effects (1) to (2) that have been achieved, the following effects are achieved. (3) For the route for which the HV mode is already planned, even the remaining amount of the battery is above the first threshold Eα, the planning of the EV mode is limited, and therefore in the case that all or most of the highway, upslope or the like is set to the HV mode, it is possible to prevent the planning of the traveling mode from being changed greatly. Therefore, the discomfort caused to the driver due to the replanning can be suppressed.

(4) When the planning of the EV mode is limited, the section having a distance of about the HV priority distance γ from the current position of the vehicle 100 is the HV priority section, and thus the sudden switching from the HV mode to the EV mode is prevented. Therefore, the discomfort caused to the driver due to the sudden switching of the traveling mode can be suppressed.

<Other Embodiments>

Note that, the above embodiments can also be implemented in the following manners. If the link data includes data by which the traveling load and the power consumption of the link can be calculated, it may not all have the structure including the link identifier 45a, the connection node 45b, the road attribute 45c, and the link cost 45d.

The battery actuator 12 may not output the SOC for the hybrid control apparatus 15, but calculate the remaining amount of the battery and output it. In the above embodiments, the hybrid control apparatus 15 calculates the power consumption Ei in a unit of link based on the link data. However, the link data may include power consumption per unit distance or the like that is calculated in advance. In this case, the hybrid control apparatus 15 may multiply the link length by the power consumption per unit distance, and thus the calculation load of the hybrid control apparatus 15 can be reduced.

In the above embodiments, the hybrid control apparatus 15 calculates the power consumption Ei. However, the battery actuator 12, the navigation control apparatus 41 or other apparatus may have a function of calculating the power consumption.

In the above embodiments, the navigation control apparatus 41 calculates the traveling load Ldi. However, other apparatus such as the hybrid control apparatus 15 may have a function of the traveling load Ldi.

In the above embodiments, the case where the traveling load Ldi of the section is obtained or calculated from information included in the map data 43 is illustrated. However, the invention is not limited thereto, and the traveling load of the section in the traveling route may be obtained or calculated from a learning database. For example, if the route has been traveled previously, the traveling load required for the previous traveling of this route that is stored in the learning database may be used. Thus, it is possible to expand the design flexibility of the moving assist apparatus.

In the above embodiments, the case where the EV mode is planned for each section substantially in the ascending order of the traveling load Ldi is illustrated. However, the invention is not limited thereto, and the determination may be based on one or more pieces of information included in the map data such as the slope of the road, the legal speed limit, and the road type, as long as the EV mode can be suitably planned, thereby planning the EV mode for each section. Further, the EV mode may be planned for each section based on efficiency of the engine and efficiency of the battery. Thus, it is possible to expand the design flexibility of the moving assist apparatus.

In the above embodiments, the traveling mode is planned for one traveling route. However, when a plurality of routes are searched, the traveling mode may be planned for each route, and the traveling mode that is planned may be displayed on the display 50 or the like.

The replanning of the traveling mode is performed in a substantially constant period. However, the replanning may be performed in other timing such as when the vehicle 100 has arrived at vicinity of the end point of the link and when the change rate of the SOC of the battery 11 is large.

In the second embodiment, when the link being traveled by the vehicle 100 is the HV planning section, at least the link after which the distance from the current position reaches the HV priority distance γ is taken as the HV priority section. In addition, when the link being traveled by the vehicle 100 is highway or upslope, when the traveling load Ldi associated with the link is above a predetermined value, when at least one condition for high speed traveling and high output traveling is satisfied, or the like, the link after which the distance from the current position reaches the HV priority distance γ may also be taken as the HV priority section.

In the second embodiment, when the link being traveled by the vehicle 100 is the HV planning section, at least the link after which the distance from the current position reaches the HV priority distance γ is taken as the HV priority section. In addition, in the HV planning section, the HV mode may also be maintained in the section of a relatively large traveling load, or be changed to the EV mode in the section of a relatively small traveling load. Thus, it is possible to reduce the frequency of causing discomfort to the driver and actively consume the electric power of the battery 11.

In the second embodiment, if the remaining amount of the battery is above the total sum ΣEi of the power consumption, all of the link are planned to be the EV planning section. However, even in the case that the remaining amount of the battery is above the total sum ΣEi of the power consumption, if the traveling load Ldi of the link is above a preset certain value, the link may also be planned to be the EV planning section.

In the above embodiments, the section for which the traveling mode is planned is taken as the link, but it may be a section that is divided by other reference. For example, it may be a section of the traveling route that is divided in a unit of 100 m. Further, it may be a section that is divided according to infection point of the slope (upslope, downslope). Further, it may be a section that is divided according to the road type. It may be a section that is divided according to the amount of traffic flow. Further, the section may be set by the navigation control apparatus 41 using the map data 43, or by the hybrid control apparatus 15.

In the above embodiments, when the remaining amount of the battery is above the first threshold Eα, the replanning for setting the EV priority section is performed. Further, the planning of the EV priority section is performed substantially before the remaining amount of the battery that is predicted by planning the EV priority section is below the second threshold Eβ. However, the charge storage amount of the battery being "above" or "larger than" the first threshold and being "below" or "less than" the second threshold depends on the values that are set for these thresholds.

In the above embodiments, the case where the navigation system 40 and the mode planning unit 16 are separately configured is illustrated. However, the invention is not limited thereto, and the navigation system 40 and the mode planning unit 16 may be provided in the same apparatus. Thus, it is possible to improve the configuration flexibility of the moving assist apparatus.

In the above embodiments, the case where the hybrid control apparatus 15 and the mode planning unit 16 is integrally configured is illustrated. However, the invention not limited thereto, and the hybrid control apparatus 15 and the mode planning unit 16 may be provided in separate apparatuses. Thus, it is possible to improve the configuration flexibility of the moving assist apparatus.

In the above embodiments, the case where the apparatuses such as the navigation system 40, the display 50, and the mode planning unit 16 are provided integrally on the vehicle 100 is illustrated. However, the invention is not limited thereto, a portable information processing apparatus such as a mobile phone and a smart phone may be used as all or part of these functions, as long as the navigation system 40, the display 50, and the mode planning unit 16 are communicatively connected to each other. For example, the navigation system 40 may be used as the portable information processing apparatus. Thus, it is possible to expand the design flexibility of the moving assist apparatus.

In the above embodiments, the case where the navigation system 40, the mode planning unit 16, the map database 42, and the like are mounted on the vehicle 100 is illustrated. However, the invention is not limited thereto, and some functions of the navigation system, the mode planning unit, the map database, and the like may be provided on an information processing apparatus outside the vehicle or a portable information processing apparatus. An information processing sensor may be cited as an example of the information processing apparatus outside the vehicle, and the mobile phone, the smart phone or the like may be cited as an example of the portable information processing apparatus. The information processing apparatus outside the vehicle may exchange information over a wireless communication line and the like. The portable information processing apparatus may be connected to the onboard network or be connected through short-range communication, and exchange information via a wireless communication line. Thus, it is possible to expand the design flexibility of the moving assist apparatus.

In the above embodiments, the battery 11 may be a battery that can be charged from an external power supply, but it may also be a battery that is charged only by an apparatus having a power generation function provided in the vehicle such as the motor apparatus as described above. In this case, it is also possible to improve the energy efficiency by setting the EV priority section when the remaining amount of the battery is above the first threshold Eα.

In the above embodiments, the HV traveling is taken as the traveling of using the engine and the motor apparatus. The HV traveling may be a mode of traveling including the case of only driving the engine, or a mode of traveling without the case of only driving the engine.

In the above embodiments, the case where the driving source of the hybrid vehicle is the electric motor and the engine is illustrated. However, the invention is not limited thereto. A moving body may have a plurality of driving sources and the environment to which each driving source is efficiently applied differs. In other words, if there are a plurality of traveling modes, it is possible to plan the traveling mode in the traveling route. For example, it may be applied to planning of traveling mode in a moving body equipped with two types of engines using different fuel, a moving body equipped with two types of electric motors having different types of battery, and the like. Thus, it is possible to expand the application range of the moving assist apparatus.

The invention claimed is:

1. A moving assist apparatus for assisting a vehicle to move from a current position to a destination, the vehicle including: an internal combustion engine; a motor apparatus that functions as an electric motor and a generator; and a secondary battery that is a power source of the motor apparatus and that stores electric power generated by regenerative braking, the moving assist apparatus comprising:
a mode planning unit configured to:
for each section obtained by dividing a traveling route from the current position to the destination, plan one traveling mode from a CD (Charge Depleting) mode of not maintaining a charge storage amount of the secondary battery and a CS (Charge Sustaining) mode of maintaining the charge storage amount of the secondary battery, based on a traveling load associated with the section, and in a case that it is impossible to travel though the entire traveling route from the current position to the destination with the CD mode and when the charge storage amount of the secondary battery is above a first threshold:

set a section, after which the charge storage amount of the secondary battery that is predicted with assumption of traveling with the CD mode is below a second threshold that is less than the first threshold by taking the section being traveled by the vehicle or the next section consecutive to this section as a reference, as a CD mode priority section that is planned to give priority to the CD mode.

2. The moving assist apparatus according to claim 1, wherein the mode planning unit is configured to, if the charge storage amount of the secondary battery is above the first threshold when the vehicle is traveling in a high speed section requiring traveling with a high speed or a high output section requiring a high output, limit setting the high speed section or the high output section as the CD mode priority section.

3. The moving assist apparatus according to claim 2, wherein the mode planning unit is configured to, if the charge storage amount of the secondary battery is above the first threshold when the vehicle is traveling in the high speed section or the high output section, set at least the high speed section or the high output section, a distance to which from a current position of the vehicle is below a certain distance, as a CS mode priority section that is planned to give priority to the CS mode.

4. The moving assist apparatus according to claim 1, wherein the mode planning unit is further configured to, after the planning of the CD mode priority section is completed, plan the CD mode in an ascending order of the traveling load for the remaining section based on the charge storage amount of the secondary battery that is below the second threshold.

5. A moving assist method for assisting a vehicle to move from a current position to a destination by using an electronic control unit (ECU), the vehicle including: an internal combustion engine; a motor apparatus that functions as an electric motor and a generator; and a secondary battery that is a power source of the motor apparatus and that stores electric power generated by regenerative braking, the moving assist method comprising:

for each section obtained by dividing a traveling route from the current position to the destination, planning, by the ECU, one traveling mode from a CD (Charge Depleting) mode of not maintaining a charge storage amount of the secondary battery having the motor apparatus as a driving source and a CS (Charge Sustaining) mode of maintaining the charge storage amount of the secondary battery, based on a traveling load associated with the section, and in a case that it is impossible to travel though the entire traveling route from the current position to the destination with the CD mode and when the charge storage amount of the secondary battery is above a first threshold:

setting, by the ECU, a section, after which the charge storage amount of the secondary battery that is predicted with assumption of traveling with the CD mode is below a second threshold that is less than the first threshold by taking the section being traveled by the vehicle or the next section consecutive to this section as a reference, as a CD mode priority section that is planned to give priority to the CD mode.

6. A moving assist apparatus for assisting a vehicle to move from a current position to a destination, the vehicle including: an internal combustion engine; a motor apparatus that functions as an electric motor and a generator; and a secondary battery that is a power source of the motor apparatus and that stores electric power generated by regenerative braking, the moving assist apparatus comprising:

an electronic control unit (ECU) configured to:

for each section obtained by dividing a traveling route from the current position to the destination, plan one traveling mode from a CD (Charge Depleting) mode of not maintaining a charge storage amount of the secondary battery and a CS (Charge Sustaining) mode of maintaining the charge storage amount of the secondary battery, based on a traveling load associated with the section, and in a case that it is impossible to travel though the entire traveling route from the current position to the destination with the CD mode and when the charge storage amount of the secondary battery is above a first threshold:

set a section, after which the charge storage amount of the secondary battery that is predicted with assumption of traveling with the CD mode is below a second threshold that is less than the first threshold by taking the section being traveled by the vehicle or the next section consecutive to this section as a reference, as a CD mode priority section that is planned to give priority to the CD mode.

7. The moving assist apparatus according to claim 6, wherein the ECU is configured to, if the charge storage amount of the secondary battery is above the first threshold when the vehicle is traveling in a high speed section requiring traveling with a high speed or a high output section requiring a high output, limit setting the high speed section or the high output section as the CD mode priority section.

8. The moving assist apparatus according to claim 7, wherein the ECU is configured to, if the charge storage amount of the secondary battery is above the first threshold when the vehicle is traveling in the high speed section or the high output section, set at least the high speed section or the high output section, a distance to which from a current position of the vehicle is below a certain distance, as a CS mode priority section that is planned to give priority to the CS mode.

9. The moving assist apparatus according to claim 6, wherein the ECU is further configured to, after the planning of the CD mode priority section is completed, plan the CD mode in an ascending order of the traveling load for the remaining section based on the charge storage amount of the secondary battery that is below the second threshold.

* * * * *